United States Patent [19]

Hafez et al.

[11] Patent Number: 4,606,903

[45] Date of Patent: Aug. 19, 1986

[54] MEMBRANE SEPARATION OF UNCOVERTED CARBON FIBER PRECURSORS FROM FLUX SOLVENT AND/OR ANTI-SOLVENT

[75] Inventors: Mahmoud M. Hafez; Laura E. Black, both of Sarnia, Canada

[73] Assignee: Exxon Research and Engineering Co., Florham Park, N.J.

[21] Appl. No.: 603,029

[22] Filed: Apr. 27, 1984

[51] Int. Cl.[4] .............................................. D01F 9/12
[52] U.S. Cl. ..................................... 423/447.4; 423/444; 210/651; 208/45; 208/180
[58] Field of Search .................. 208/45, 180; 210/651; 423/447.4, 449

[56] References Cited

U.S. PATENT DOCUMENTS

| | | | |
|---|---|---|---|
| 2,923,749 | 2/1960 | Lee et al. | 260/674 |
| 2,930,754 | 3/1960 | Stuckey | 210/23 |
| 2,947,687 | 8/1960 | Lee | 210/23 |
| 2,958,657 | 11/1960 | Binning et al. | 210/23 |
| 2,970,106 | 1/1961 | Binning et al. | 208/347 |
| 2,981,680 | 4/1961 | Binning | 210/23 |
| 2,985,588 | 5/1961 | Binning et al. | 210/23 |
| 3,043,891 | 7/1962 | Stuckey | 260/674 |
| 3,140,256 | 7/1964 | Martin et al. | 210/23 |
| 3,225,107 | 12/1965 | Kirkland et al. | 260/652 |
| 3,228,876 | 1/1966 | Mahon | 210/22 |
| 3,305,595 | 2/1967 | Paulson | 260/674 |
| 3,370,102 | 2/1968 | Carpenter et al. | 260/674 |
| 3,504,048 | 3/1970 | de Rosset | 260/674 |
| 3,556,991 | 1/1971 | Gerhold | 208/321 |
| 3,720,321 | 3/1973 | Coughlin et al. | 210/550 |
| 3,789,079 | 1/1974 | Perry et al. | 260/681.5 |
| 3,853,754 | 12/1974 | Gosser | 210/23 |
| 3,919,075 | 11/1975 | Parc et al. | 208/180 |
| 3,930,990 | 1/1976 | Brun et al. | 208/308 |
| 4,062,882 | 12/1977 | Gupta | 260/428.5 |
| 4,113,628 | 9/1978 | Alegranti | 210/500 |
| 4,115,465 | 9/1978 | Elfert et al. | 260/674 |
| 4,154,770 | 5/1979 | Kaplan | 585/332 |
| 4,277,324 | 7/1981 | Greenwood | 423/447.4 |
| 4,277,325 | 7/1984 | Greenwood | 423/447.4 |

FOREIGN PATENT DOCUMENTS

| | | |
|---|---|---|
| 0013834 | 6/1980 | European Pat. Off. |
| 8170805 | 6/1981 | Japan . |
| 58-42605 | 3/1983 | Japan .................................. 210/651 |
| 1435151 | 5/1976 | United Kingdom . |
| 1434639 | 5/1976 | United Kingdom . |
| 2051664A | 1/1981 | United Kingdom . |
| 2073654A | 10/1981 | United Kingdom . |
| 2116071A | 9/1983 | United Kingdom . |

OTHER PUBLICATIONS

Chemical Abstracts 96: 7752n.
Chemical Abstracts 99: 71603d.
New Polyimide Ultrafiltration Membranes for Organic Use, Journal of Membrane Science, Iwama et al., pp. 297-309, 1982.
"Separation of Aromatics and Naphthenens by Permeating through Modified Vinylidiene Fluoride Films", McCandless, Ind. Eng. Chem. Process. Des. Develop., vol. 12, #3, 1973, pp. 354–359.
"Regeneration of Used Lubricating Oils by Ultrafiltration", Defives, et al., Information Chemie #175, pp. 127-131, Mar., 1978.
"Asymmetric Polyimide Membranes for Filtration of Non-Aqueous Solutions", Strathmann, Desalination 26 (1978) 85-91.

Primary Examiner—Gregory A. Heller
Attorney, Agent, or Firm—Joseph J. Allocca

[57] ABSTRACT

Flux solvents and/or pitch neomesophase anti-solvents used in the generation of carbon fiber precursors from pitch are separated from mixtures of such solvent and uncoverted carbon fiber precursors by contacting said mixtures with asymmetric hydrophobic membranes under conditions of reverse osmosis. The membranes used in this separation are asymmetric polyimide membranes and asymmetric polyvinylidene fluoride membranes. Separation conditions include a contacting pressure sufficient to overcome the osmotic pressure of the solvent. The pressure is typically about 300 to 1000 psi. Contacting temperature is about 0° to 100° C., preferably about 20° to 80° C. The membrane of choice is an asymmetric polyimide membrane.

13 Claims, 2 Drawing Figures

FIG. I

MEMBRANE SEPARATION OF UNCOVERTED CARBON FIBER PRECURSORS FROM FLUX SOLVENT AND/OR ANTI-SOLVENT

DESCRIPTION OF THE INVENTION

The present invention is directed to a method for separating flux solvent and/or pitch neomesophase anti-solvent used in the production of carbon fiber precursors from pitch from mixtures of said solvent(s) and unconverted carbon fiber precursors, (UCFP) using asymmetric hydrophobic membranes under conditions of reverse osmosis.

In the present separation process the membranes of choice are asymmetric polyimide membranes and asymmetric polyvinylidene fluoride (PVF) membranes. The separation is conducted under reverse osmosis conditions, that is, the separation is pressure driven. The mixture to be separated comprising flux solvent and/or pitch neomesophase anti-solvent and unconverted carbon fiber precursors is contacted with one side of the asymmetric membrane under a pressure at least sufficient to overcome the osmotic pressure of the system. To insure an adequate driving force a pressure somewhat higher than the osmotic pressure is employed. The pressure applied typically ranges from about 300 to 1000 psi, the upper limit being effectively set by the mechanical limitations of the membrane (e.g., compaction, rupture, etc.) Preferably, the pressure is in the range of about 400 to 600 psi. This separation can be performed at a temperature of between 0° to 100° C., preferably 20° to 80° C., most preferably 40° to 70° C.

As previously stated, the membranes of choice are selected from the group consisting of asymmetric polyimide membranes and asymmetric polyvinylidene fluoride (PVF) membranes. Membranes are considered asymmetric if they are inhomogeneous in their cross-sectional profile. Asymmetric membranes typically are viewed as comprising a relatively dense thin skin layer of the polymer making up the membrane on a relatively less dense or porous, thick support layer of the same polymeric material. In this way a thin, selective film, which would be extremely fragile and difficult to handle, can be produced in a form which can be handled thanks to the integral presence of the less dense/porous thick support layer. In using such asymmetric membranes in separation application the mixtures to be separated are typically contacted with the high density thin skin layer. Asymmetric membranes produced employing a water gelation bath, or some other highly polar gelation non-solvent for the polymer, or containing, e.g. glycerol or glycerin, are preconditioned for use in the present separation process. This preconditioning takes the form of exposing the membrane to a solvent or series of solvent of lower polarity than the gelation solvent. For example, the water gelled membrane can be exposed to a ketone, such as methyl ethyl ketone followed by toluene. If the membrane contains glycerine or glyceride the solvent sequence can be e.g. water, to wash out the glycerine or glyceride, followed by e.g. ketone and toluene. This exposure can be under pressure (e.g. pressure permeation) or can constitute a mere soaking of the membrane in the treatment solvent or series of solvents. The membrane is then hydrophobic in nature and suitable for use in the present separation process.

This membrane separation process by which flux solvent and/or pitch neomesophase anti-solvent are separated from unconverted carbon fiber precursors is suitable as a complete replacement for the distillation separation process presently employed in the overall carbon fiber precursor/carbon fiber production process.

Figure 1:
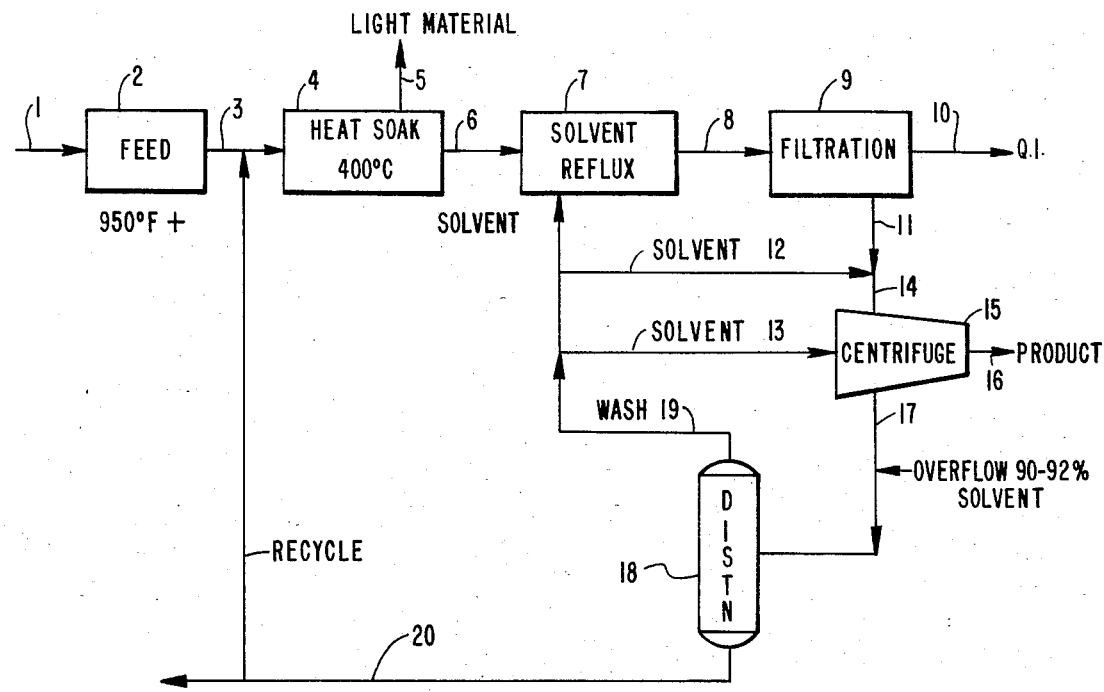
FIG. 1 is a schematic of one embodiment of the carbon fiber precursor production process which employs distillation for solvent recovery.

A carbon fiber production process in which this membrane separation process is readily installable is described in U.S. Pat. No. 4,277,324 and U.S. Pat. No. 4,277,325.

In those processes the neomesophase former fraction of pitch is used to produce carbon artifact (carbon fiber). The process employs as a feedstock the carbonaceous residues of petroleum origin, including distilled or cracked residuums of crude oil and hydrodesulfurized residues of distilled or cracked crude oil. These feedstocks are particularly the carbonaceous graphitizable petroleum pitches.

As is well known, pitches typically include insoluble and infusable materials which are insoluble in organic solvents such as quinoline or pyridine. These insoluble materials, commonly referred to as quinoline insolubles, normally consist of coke, carbon black, catalyst fines and the like. In carbon fiber production, it is necessary, of course, to extrude the pitch through a spinnerette having very fine orifices. Consequently, the presence of any quinoline insoluble material is highly undesirable since it can plug or otherwise foul the spinnerette during fiber formation.

Additionally, since many carbonaceous pitches have relatively high softening points, incipient coking frequently occurs in such materials at temperatures where they exhibit sufficient viscosity for spinning. The presence of coke and other infusable materials and/or undesirably high softening point components generated prior to or at the spinning temperatures are detrimental to processability and product quality. Moreover, a carbonaceous pitch or feedstock for carbon fiber production must have a relatively low softening point or softening point range and a viscosity suitable for spinning the feedstock into fibers. Finally, the feedstock must not contain components which are volatile at spinning or carbonization temperatures since such components also are detrimental to product quality.

The term "pitch" as used herein means petroleum pitches, natural asphalt and pitches obtained as by-products in the naphtha cracking industry, pitches of high carbon content obtained from petroleum, asphalt and other substances having properties of pitches produced as by-products in various industrial production processes.

The term "petroleum pitch" refers to the residuum carbonaceous material obtained from the thermal and catalytic cracking of petroleum distillates including a hydrodesulfurized residuum of distilled and cracked crude oils.

Generally pitches having a high degree of aromaticity are suitable for use in the process. Indeed, aromatic carbonaceous pitches having high aromatic carbon contents of from about 75% to about 90% as determined by nuclearmagnetic resonance spectroscopy are generally useful in the process. So, too, are high boiling, highly aromatic streams containing such pitches or that are capable of being converted into such pitches.

On a weight basis, the useful pitches will have from about 88% to about 93% carbon and from about 7% to about 5% hydrogen. While elements other than carbon and hydrogen, such as sulfur and nitrogen, to mention a few, are normally present in such pitches, it is important that these other elements do not exceed 4% by weight of the pitch, and this is particularly true when forming carbon fibers from these pitches. Also, the useful pitches typically will have a number average molecular weight of the order of about 300 to 4,000.

Those petroleum pitches which are well-known graphitizable pitches meeting the foregoing requirements are preferred starting materials. Thus, it should be apparent that carbonaceous residues of petroleum origin, and particularly isotropic carbonaceous petroleum pitches which are known to form mesophase in substantial amounts, for example in the order of 75% to 95% by weight and higher, during heat treatment at elevated temperatures, for example in the range of 350° C. to 450° C., are especially preferred starting materials for the practice of the present invention.

In producing suitable carbon fiber precursors, the quinoline insoluble substances and other undesirable high softening point components present in the isotropic carbonaceous feedstocks, and particularly isotropic carbonaceous graphitizable pitches, can be readily removed by fluxing the feedstock with an organic solvent thereby providing a fluid pitch having substantially all of the quinoline insoluble material of the pitch suspended in the fluid in the form of a readily separable solid.

Broadly speaking, then, the present invention contemplates an integrated process for treating an isotropic carbonaceous graphitizable pitch with an organic fluxing liquid to provide a fluid pitch which has suspended therein substantially all of the quinoline insoluble material in the pitch and which solid material is readily separable by filtering, centrifugation and the like. Thereafter, the fluid pitch is treated with an antisolvent compound (preferably at ambient temperature) so as to precipitate at least a substantial portion of the pitch free of quinoline insoluble solids.

The precipitated material is separated from the antisolvent by means of typical solid/liquid separation devices (e.g., filters, centrifuge). The anti-solvent/unconverted carbon fiber precursor mixture remaining is then separated into an anti-solvent rich permeate phase and an unconverted carbon fiber precursor rich (anti-solvent lean) retentate phase by means of the membrane separation procedure detailed herein.

The fluxing compounds suitable in the practice of the present invention include tetrahydrofuran, toluene, light aromatic gas oil, heavy aromatic gas oil, tetralin and the like when used in the ratio, for example, of from about 0.5 parts by weight of fluxing compound per weight of pitch to about 3 parts by weight of fluxing compound per weight of pitch. Preferably, the weight ratio of fluxing compound to pitch is in the range of about 1:1 to about 2:1.

Among the anti-solvents suitable in the practice of the present invention are those solvents in which isotropic carbonaceous pitches are relatively insoluble such anti-solvent substances include aliphatic and aromatic hydrocarbons such as heptane and the like. For reasons which are described hereinafter in greater detail, it is particularly preferred that the anti-solvent employed in the practice of the present invention have a solubility parameter of between about 8.0 and 9.5 at 25° C.

Among mixed solvent systems a mixture of toluene and heptane is preferred, having greater than about 60 volume percent toluene, such as 60% toluene/40% heptane, and 85% toluene/15% heptane.

The amount of anti-solvent employed will be sufficient to provide a solvent insoluble fraction which is capable of being thermally converted to greater than 75% of an optically anisotropic material in less than ten minutes. Typically, the ratio of organic solvent to pitch will be in the range of about 5 ml to about 150 ml of solvent per gram of pitch.

In a preferred embodiment the carbon fiber precursor production process heat soaks the pitch feedstock at from 350° to 450° C. for a time sufficient to produce spherules visible under polarized light at from 10× to 1,000 ×magnification in the pitch, prior to the addition of the flux solvent.

DETAILED DESCRIPTION OF A PREFERRED EMBODIMENT

As shown in FIG. 1, in the art as currently practiced a petroleum pitch is introduced via line 1 into a heat soaker furnace 2 where it is heated at temperatures in the range of 350° C. to 450° C. Additional heating of the pitch is provided in heat soaking vessel 4. The pitch is introduced into vessel 4 via line 3. Volatile material is removed from the heat soaking vessel via line 5. After heat soaking, the heat soaked product is introduced into the fluxing zone 7 via line 6 where it is mixed with the appropriate fluxing liquid such as toluene. After fluxing the pitch, the fluxed pitch is passed via line 8 to a separation zone 9 and the materials which are insoluble in the fluxed pitch are removed via line 10. The fluid pitch, after removal of solids, is sent into the precipitation zone 11 wherein an anti-solvent, such as toluene/heptane, is introduced via line 12 and 13. After precipitation of the pitch, the so-precipitated material can be sent via line 14 into a solid product separation zone 15. The neomesophase solid can be removed via line 16 and the solvent with unconverted material can be sent via line 17 to a solvent recovery zone 18 (distillation tower). The molecular weight of the unconverted material is between 300 and 4,000 number average molecular weight and preferably between 500 to 1,000. The solvent recovered in line 18 can be recycled to the fluxing zone 7 and the precipitation zone 11. The soluble oils are removed via line 20 and can be recycled to the heat soaking step or used as a feedstock for carbon black and the like.

Figure 2:
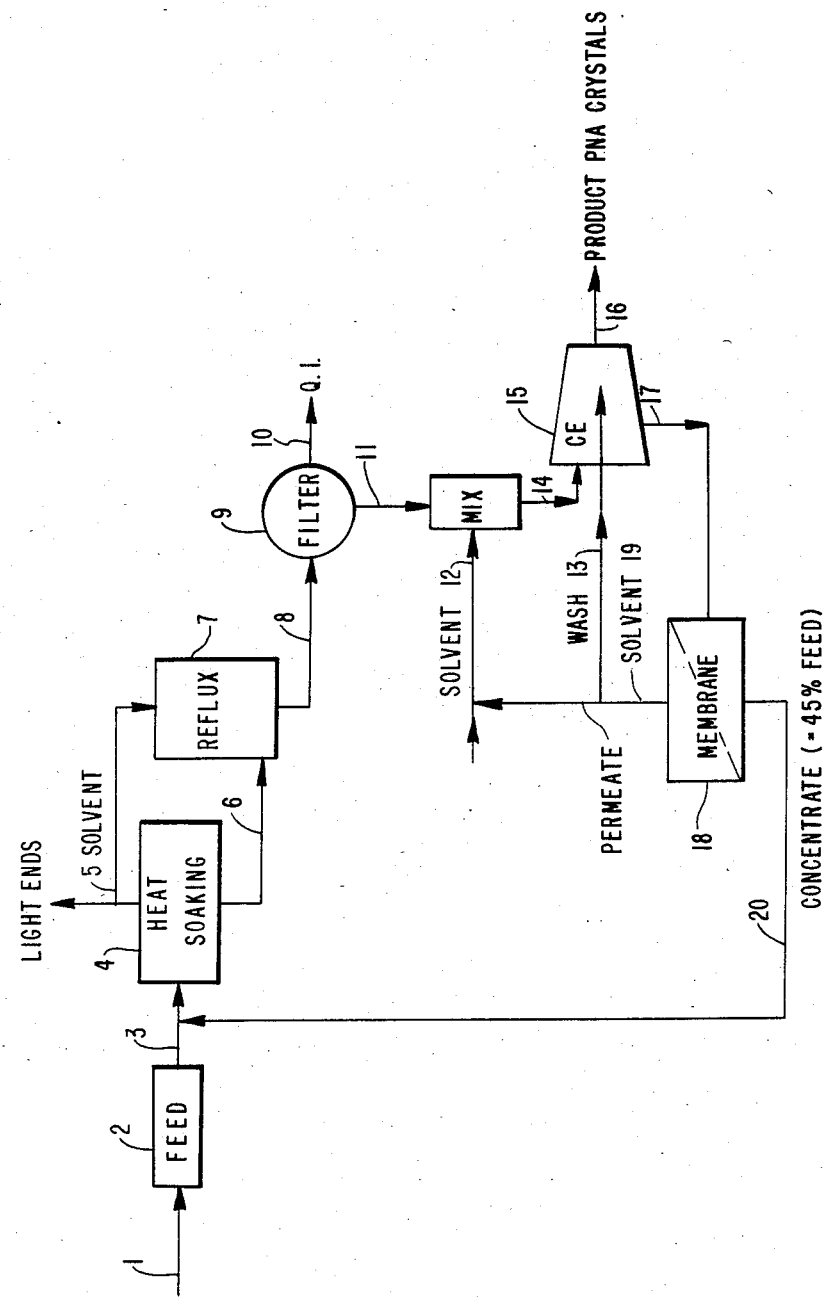
FIG. 2 is a schematic of an improved embodiment of FIG. 1, the improvement comprising the integration of a membrane separation sequence into the process for solvent recovery.

As taught by the present invention, the solvent recovery steps by distillation as practiced in the art in zone 18 which is energy intensive and costly is replaced by a membrane separation process for the separation of the solvents from the unconverted carbon fiber precursor. A membrane of a thin semi-permeable barrier that selectively permeates a portion of the stream is used. A membrane integrated process for the treatment of pitches in carbon artifact manufacture is shown in FIG. 2. Membrane separation modules replace the distillation tower in solvent recovery zone 18.

The integration of the membrane separation into the total process is as follows:

(1) The solvent with unconverted material or unconverted carbon fiber precursors, UCFP contains from 90% to 94% solvent. A membrane process recovers 75% to 85% of this solvent. This high recovery is possible because the initial solute concentration is low.

(2) The recovered solvent collected in line 19 is recycled to the precipitation step and the centrifuged wash via lines 12 and 13. The level of UCFP in this recycled solvent must be less than 2%, and preferably less than 1%.

(3) The concentrate from the membrane process is recycled directly via line 20 to the heat soaking step where the solvent is recovered with the light ends and sent to the solvent reflux stage. The concentrate should contain between 30% to 50% UCFP.

In the commercial utilization of the process, multistage operation is permissable to attain the desired concentrations of both permeate and retentate streams. Separations are carried out by removal of the solvent, e.g. toluene/heptane, through the membrane leaving behind a more concentrated solution of UCFP in toluene/heptane at the feed side of the membrane.

The membrane may be in the form of a simple disc or sheet of membrane or may be in the form of hollow fibers or tubes. Various configurations are well known for use in commercial installations, e.g. hollow fiber bundles, plate and frame elements and spiral wound elements.

It is desirable in this process to use a membrane that is hydrophobic in nature to allow ready permeation of the solvents, e.g. toluene/heptane. Very hydrophilic membranes, such as regenerated cellulose, can be pretreated such that they will permeate toluene/heptane, but the permeation rate rapidly drops to zero due to the collapse of the pores of the membrane in presence of heptane. Thus, desirable membranes for this process are those that are less hydrophilic than regenerated cellulose.

The structure of the membrane is very important in achieving high flux. Asymmetric membranes are preferred. An example of such membranes are polyvinylidene fluoride (PVF) and polyimide membranes. The preferred membrane for this separation is the polyimide as it yields a better separation between the toluene/heptane solvents and the UCFP. Both polyimide membranes and PVF membranes can concentrate the feed solution up to 50% unconverted carbon fiber precursor but the polyimide does so at a higher selectivity which yields a cleaner permeate stream.

This membrane separation process can be operated within the temperature range where the feed exists as a liquid under the applied pressure. The temperature boundaries are limited further by the thermal stability of the membrane. The boundaries are still further limited by the effect of temperature on the performance of the membrane. As the temperature increases, the permeation rate increases while the selectivity of the membrane declines. The desired range of temperature for this process is between about 0° to 100° C., preferably between about 20° to 80° C. most preferably between about 40° to 70° C. The polyimide membrane is again superior over the PVF membrane in its response to an increase in temperature. The selectivity of the polyimide only drops slightly between 20° and 50° C. while the selectivity of the PVF membrane drops significantly.

The present invention is practiced with conventional procedures and apparatus. The best type of membrane for the separation of toluene/heptane solvents from UCFP has been found to be asymmetric membranes that are more hydrophobic than regenerated cellulose, in particular asymmetric polyimide and polyvinylidene fluoride membranes.

Polyvinylidine fluoride membranes are known and have been described for various separations in numerous patent and articles, see, e.g. GB No. 2065706A, EP No. 40670A2, U.S. Pat. No. 4,238,571, EP No. 12557, GB No. 1566253, DE No. 2,900764.

Polyimide polymer membranes and the use of such membranes to effect various types of separations are presented in numerous patents. See, for example, U.S. Pat. No. 4,307,135, U.S. Pat. No. 3,708,458, U.S. Pat. No. 3,789,079, U.S. Pat. No. 3,546,175, U.S. Pat. No. 3,179,632, U.S. Pat. No. 3,179,633, U.S. Pat. No. 3,925,211, U.S. Pat. No. 4,113,628, U.S. Pat. No. 3,816,303, U.S. Pat. No. 4,240,914, U.S. Pat. No. 3,822,202, U.S. Pat. No. 3,853,754, G.B. Pat. No. 1,434,639.

In copending application U.S. Ser. No. 494,543, filed May 13, 1983 and its Continuation-in-Part U.S. Ser. No. 564,302 filed Dec. 22, 1984, a process for producing an asymmetric polyimide polymer membrane from an undegraded, fully imidized, highly aromatic polyimide copolymer, and the use of such membrane for the separation of mixtures of organic liquids is described. The asymmetric polyimide membrane described therein is the membrane of choice for use in the present process. As recited in U.S. Ser. No. 494,543 and U.S. Ser. No. 564,302, the polyimide polymer starting material is in the undecomposed, undeteriorated form (i.e. polymer which was not in contact with water for too long a time after precepitation and producton and prior to drying and granulation) and is preferably recovered using a nonaqueous solvent from commercially available solutions of the polymer in solvent. Upjohn 2080 DHV, which contains about 25% polymer in dimethylformamide DMF solvent, is a suitable source. The polymer itself is the subject of U.S. Pat. No. 3,708,458 and is the cocondensation product of benzophenone 3,3', 4,4'-tetracarboxylic acid dianhydride (BTDA) and a mixture of di(4-amino phenyl) methane and toluene diamine, or their corresponding diisocyanates, 4,4'-methylenebis(phenyl isocyanate) and toluene diisocyanate. For example, as described in U.S. Ser. No. 494,543 and U.S. Ser. No. 564,302, one liter of Upjohn 2080 DHV is transferred to a blender and three successive 300 ml portions of acetone are added with 5 min. mixing at low speed between each addition. Subsequently, the blender contents are emptied into a container and permitted to settle. The liquid is decanted and 1.5 liters of acetone added and the mixture stirred thoroughly. The mixture is filtered through a course filter (Whatman #4). The polymer is washed by remixing with another 2 liters of acetone. After filtering, the polymer is dried in vacuum (15 inches Hg) at 45°–60° C. for 3 hours. The polymer powder is ready for use.

A suitable membrane can be cast from the undeteriorated, undegraded polymer (preferably from the polymer recovered as described above) using a casting solution comprising about 14–30 weight percent polymer preferably about 16–25 weight percent polymer more preferably about 18–22 weight percent polymer preferably in dioxane:DMF solvent (about 10:1 to 1:1 D/DMF more preferably about 7:1 to 3:1 D/DMF). This solution is spread on a moving casting belt at a casting speed of about 3–5 ft/min and the film allowed to partially evaporate in dry air, preferably for about 2 to 120 seconds more preferably about 2-30 seconds before gelation in a gelation bath, which is preferably water (neutral pH). The gellation water is preferably replaced with glycerin to retard membrane deterioration (hydrolysis). The membrane can be fabricated into element. Membranes in the form of tubes or fibers can be bundled, potted and manifolded, much in the manner described in U.S. Pat. 3,228,877. Membranes in the form of sheets can be employed in plate and frame configuration or in the spiral wound element configuration. Spiral wound membrane element configurations are generally described in U.S. Pat. No. 3,417,870, U.S. Pat. No. 3,173,867, U.S. Pat. No. 3,367,574, U.S. Pat. No. 3,386,583 and U.S. Pat. No. 3,397,790, to list just a few.

The spiral wound element will typically comprise layers of membrane wound around a central tube (metal or solvent resistant plastic) containing holes for the permeate, the membrane layers being separated by alternate layers of a permeate carrier, such as knitted Simplex (Dacron, with melamine formaldehyde stiffener), and a feed spacer made of Vexar (a polypropylene mesh). Membrane layers are typically sealed using an epoxy adhesive to sandwich the permeate cloth into a closed envelope in fluid communication with the perforated central tube leaving the perforations in the central tube as the only permeate outlet. The preferred epoxy adhesive will generally comprise resin formulation such as one comprising (1) Epon 828, which is a reaction product of bisphenol-A and epichlorohydrin; (2) Cabosil M5; (3) Versamid 140 (a polyamide curing agent); and (4) DMF solvent wherein the components 1/2/3/4/5 are present in typical relationship based on parts by weight of about 100/10/60/4/12, which cures at about 25° C. over a 21 day period. This adhesive system is described and claimed in copending application U.S. Ser. No. 494,409, filed May 13, 1983 now, U.S. Pat. No. 4,464,494. The layers of membrane, permeate carrier, and feed spacer are wound around the central tube in a fashion consistent with preparing a spiral wound element. After the element is cured, the ends of the element are trimmed, a nylon seal carrier and a nylon anti-telescoping device are then added. The element is then covered on the outside with an epoxy reinforced fiberglass outer wrap. Elements of any size can be prepared, but typical elements are about 8 inches in diameter and about 40 inches long, and have about 225 square feet of membrane area and can be used at feed flow rates of about 30-50 gallons per minute at a 5-15 psi pressure drop.

The following examples illustrate specific embodiments of the present invention. In the examples, the membranes employed were in the form of film discs and were mounted in a membrane holder.

EXAMPLE A

In the Examples the polyimide polymer membrane were prepared in the following manner. Polyimide polymer membrane #1 was produced using 19% of undegraded granular Upjohn polyimide 2080 polymer in a solvent compound of 2/1 dioxane:dimethyl formamide. The resulting casting dope was cast into a thin film on a nylon backing, allowed to evaporate for about 15 to 20 seconds (in dry air) and gelled in a room temperature bath of tap water.

Polyimide polymer membrane #2 was produced using 20% of the same polymer used to produce membrane #1 in a solvent composed of 5/1 dioxane-dimethyl formamide. The resulting casting dope was cast into a thin film on a glass plate, allowed to evaporate for 2 seconds (in room air) and gelled in a room temperature bath of tap water.

EXAMPLE 1

Tests were conducted for the purpose of determining the steady state permeation rates of toluene/heptane solvents through various membranes. These included regenerated cellulose membranes (molecular weight cut off of about 10,000 to 12,000 for aqueous solutions), polycarbonate membranes from Nucleopore (pore size=0.015 $\mu$) and PVF (F-type from Nucleopore) membranes (molecular weight cut off about 5,000). Two asymmetric polyimide membranes prepared in the laboratory from Upjohn polyimide polymer (as previously described) were also used. The regenerated cellulose membranes were pretreated by successively permeating with the series water, methanol, methyl ethyl ketone, and toluene before the toluene/heptane feed. Similarly, the polyimide membrane was pretreated with the series water, methyl ethyl ketone and toluene. Pretreatment was for one hour with each member of the series at 400 psig at ~23° C. The other membranes required no pretreatment before exposure to the toluene/heptane solvent. A mixture of 80/20 toluene/heptane was then permeated through these membranes at 23° C. and 400 PSI. The initial permeation rates and the steady state rates are shown in the table.

The results show that regenerated cellulose membranes become impermeable to the toluene/heptane solvent, the polyimide membranes decrease to a lower flux while both the polycarbonate and F-type membranes maintain constant flux.

TABLE 1

| | Initial Permeation Rate l/m²d | Steady State Permeation Rate l/m²d |
| --- | --- | --- |
| Regenerated Cellulose | 500 | 0 |
| Polycarbonate | 700 | 700 |
| PVF Membranes | 500 | 500 |
| Polyimide #1 | 2,250 | 925 |

EXAMPLE 2

Tests were conducted for the purpose of determining the performance of the membranes mentioned in Example 1 with a feed composed of 8 to 10 weight percent UCFP in a 80/20 toluene/heptane solvent. The number average molecular weight of the UCFP was approximately 700. The membranes were pretreated as in Example 1. The experimental conditions were the same as in Example 1. The performance of the membranes with time is shown in the table.

The results show that polycarbonate membranes deteriorate on performance with time. The PVF type membranes and the polyimide membranes yielded constant performance with time.

TABLE 2

| | Polycarbonate | | PVF Type | | Polyimide #1 | | Polyimide #2 | |
| --- | --- | --- | --- | --- | --- | --- | --- | --- |
| Time (Hr) | % R | Flux (l/m²d) | % R | Flux (l/m²d) | % R | Flux (l/m²d) | % R | Flux (l/m²d) |
| 1 | 65 | 700 | 75.5 | 400 | 91.3 | 350 | 92.6 | 245 |
| 2 | 57 | 600 | 75.5 | 350 | 91.4 | 325 | 93.6 | 250 |
| 3 | 42 | 300 | 75.5 | 300 | 91.5 | 275 | 94.3 | 240 |
| 4 | 40 | 180 | 75.5 | 300 | 91.5 | 300 | 94.3 | 250 |
| 5 | 44 | 180 | 75.5 | 300 | | | | |

TABLE 2-continued

| Time (Hr) | Polycarbonate | | PVF Type | | Polyimide #1 | | Polyimide #2 | |
|---|---|---|---|---|---|---|---|---|
| | % R | Flux (l/m²d) | % R | Flux (l/m²d) | % R | Flux (l/m²d) | % R | Flux (l/m²d) |
| 6 | | | 75.5 | 300 | | | | |

EXAMPLE 3

Tests were conducted with the PVF type membrane and the polyimide membrane with feeds containing from 10% UCFP to 50% UCFP in 80/20 toluene/heptane solvent. The performance of the membrane with different feed concentrations is shown in the table.

Both polyimide and F-type membranes can concentrate the feed, but the polyimide membrane yields a better performance.

TABLE 3

| % UCFP In Feed | Flux (l/m²d) | % R |
|---|---|---|
| PVF TYPE MEMBRANES | | |
| 11.8 | 300 | 77.2 |
| 15.0 | 300 | 78 |
| 26.0 | 225 | 80 |
| 31.4 | 175 | 81 |
| 38.0 | 175 | 84 |
| POLYIMIDE #1 MEMBRANES | | |
| 21.6 | 280–300 | 91.3–91.5 |
| 23.4 | 200 | 95.1–95.3 |
| 30.7 | 140 | 94.7–95.0 |
| 42.9 | 87.5 | 95.1–95.3 |
| 48.9 | 72 | 95.3 |

EXAMPLE 4

Tests were conducted at various temperatures with the PVF type membrane and polyimide membrane. All other conditions of the test were as described in Example 2. The performance of the membranes is shown in the table. These results show that while the flux increases for both of the membranes as the temperature is raised, the selectivity of the PVF type membrane falls drastically, while the selectivity of the polyimide only falls slightly.

TABLE 4

| PVF TYPE MEMBRANE | | | POLYIMIDE #2 MEMBRANE | | |
|---|---|---|---|---|---|
| Temperature °C. | Flux (l/m²d) | % R | Temp. °C. | Flux l/m²d | % R |
| 21 | 300 | 76 | 22.7 | 150 | 96.4 |
| 35 | 440 | 53 | 32.5 | 250 | 95.4 |
| | | | 40.5 | 275 | 95.0 |
| | | | 51.5 | 300 | 93.6 |

What is claimed is:

1. A method for separating flux solvent and/or pitch anti-solvent from a mixture comprising the flux solvent and/or anti-solvent and unconverted carbon fiber precursors dissolved in said flux solvent and/or anti-solvent which method comprises contacting said mixture with one side of an asymmetric membrane selected from asymmetric polyimide membranes under reverse osmosis conditions comprising a pressure at least sufficient to overcome the osmotic pressure of the flux solvent and/or anti-solvent and a temperature of about 0° to 100° C. so as to separate the mixture into a flux solvent and/or anti-solvent rich permeate stream and an unconverted carbon fiber precursor rich-flux solvent and/or anti-solvent lean retentate stream.

2. The method of claim 1 wherein the pressure is about 400 to 600 psi.

3. The method of claim 1 wherein the temperature is about 20° to 80° C.

4. The method of claim 1, 2, or 3 wherein the flux solvent and/or anti-solvent is an aromatic hydrocarbon or a mixture of aromatic hydrocarbons and aliphatic hydrocarbons, tetrahydrofuran, tetralin.

5. The method of claim 4 wherein the anti-solvent is a mixture of toluene and heptane.

6. The method of claim 5 wherein the toluene/heptane mixture comprises about 80% toluene and 20% heptane.

7. The method of claim 6 wherein the anti-solvent-unconverted carbon fiber-precursor mixture comprises about 90% anti-solvent.

8. In a process for producing carbon fibers from pitch wherein the pitch is heat soaked at from 350°–450° C., then mixed with an organic fluxing liquid which suspends the quinoline insoluble fraction, separating the solids from the fluid pitch, adding an anti-solvent to the fluid pitch to precipitate the neomesophase of the fluid pitch, separating the precipitated solid from the anti-solvent and unconverted carbon fiber precursors and recovering the anti-solvent and recycling it to the process, the improvement comprising performing the anti-solvent recovery step using a reverse osmosis membrane separation procedure employing a membrane selected from asymmetric polyimide membranes, said separation being conducted by contacting the anti-solvent/unconverted carbon fiber precursor mixture with the membrane at a pressure of from about 300 to 1,000 psi at a temperature of from 0° to 100° C. and recovering the anti-solvent permeate stream.

9. The process of claim 8, wherein the pressure is about 500 to 600 psi.

10. The process of claim 8 wherein the temperature is about 20° to 80° C.

11. The process of claim 8, 9, or 10 wherein the anti-solvent is an aromatic hydrocarbon or a mixture of aromatic hydrocarbons and aliphatic hydrocarbons.

12. The process of claim 11 wherein the anti-solvent is a mixture of toluene and heptane.

13. The process of claiam 12 wherein the anti-solvent comprises about 90% of the anti-solvent/unconverted carbon fiber precursor mixture.

* * * * *